United States Patent [19]

Druyvesteyn et al.

[11] Patent Number: 5,161,210
[45] Date of Patent: Nov. 3, 1992

[54] CODER FOR INCORPORATING AN AUXILIARY INFORMATION SIGNAL IN A DIGITAL AUDIO SIGNAL, DECODER FOR RECOVERING SUCH SIGNALS FROM THE COMBINED SIGNAL, AND RECORD CARRIER HAVING SUCH COMBINED SIGNAL RECORDED THEREON

[75] Inventors: Willem F. Druyvesteyn; Abraham Hoogendoorn; Leon M. Van De Kerkhof; Raymond N. J. Veldhuis, all of Eindhoven, Netherlands

[73] Assignee: U.S. Philips Corporation, New York, N.Y.

[21] Appl. No.: 433,631

[22] Filed: Nov. 8, 1989

[30] Foreign Application Priority Data

Nov. 10, 1988 [NL] Netherlands .................. 8802769
Apr. 25, 1989 [NL] Netherlands .................. 8901032

[51] Int. Cl.⁵ .......................... G10L 9/00; G10L 7/04
[52] U.S. Cl. ............................................ 395/2; 381/31
[58] Field of Search .......................... 381/29–40; 395/2

[56] References Cited

U.S. PATENT DOCUMENTS 4,455,649  6/1984  Esteban et al. ............... 381/29
4,535,472  8/1985  Tomcik ...................... 381/31
4,703,480 10/1987  Westall et al. .............. 381/30
4,903,301  2/1990  Kondo et al. ................ 381/30

Primary Examiner—Allen R. MacDonald
Assistant Examiner—David D. Knepper
Attorney, Agent, or Firm—Leroy Eason

[57] ABSTRACT

The audio signal is divided into frequency sub-bands, the sub-band samples are quantized according to a predetermined quantizing criterion, and the quantized samples in one or more sub-bands are summed with samples of the auxiliary signal in such sub-bands, the auxiliary signal sample in a sub-band having a maximum amplitude less than half the quantization step used in such sub-band. The combined signal, covering the entire frequency band of the audio signal, can be transmitted or recorded on a record carrier. Upon audio reproduction at a receiver only the audio signal will be audible, the auxiliary signal being masked due to the psycho-acoustic characteristics of the human auditory system which are unresponsive to low-level noise in the presence of high amplitude sound. The receiver includes a decoder which analyzes the combined signal into the original frequency sub-bands and re-quantizes the sub-band signals using the same quantizing criterion as at the coder. The auxiliary signal is reconstructed by subtracting the quantized signal sample in each sub-band from the non-quantized signal sample therein and combining the non-quantized sub-band signal sample. The auxiliary signal may be a copy inhibit code which serves to inhibit a recorder from recording the audio signal, thus protecting against unauthorized copying.

14 Claims, 6 Drawing Sheets

CODER FOR INCORPORATING AN AUXILIARY INFORMATION SIGNAL IN A DIGITAL AUDIO SIGNAL, DECODER FOR RECOVERING SUCH SIGNALS FROM THE COMBINED SIGNAL, AND RECORD CARRIER HAVING SUCH COMBINED SIGNAL RECORDED THEREON

BACKGROUND OF THE INVENTION

1. Field of the Invention

The invention relates to a coder for incorporating extra information in the form of an auxiliary signal in a digital audio signal having a predetermined format, a decoder for extracting this extra information from the digital signal, a device for recording the digital signal on a record carrier, and a record carrier obtained by means of such a device.

2. Description of the Related Art

In digital sound transmission and recording systems, such as CD players, future television systems, such as D2MAC, and so on, the format, i.e. the sampling rate and the number of bits per sample, by which the digital sound signal is recorded or transmitted, is generally predetermined, for example, by international agreements. Sometimes, however, there is a need for recording or transmitting more information than possible on the basis of the available number of channels. For example, on the basis of international agreements, no more than two high-quality digital audio channels, for example, each channel for 14-bit digital signals, can be available in specific future television systems. These channels are used for transmitting stereophonic audio information for respective left and right-hand channels. However, there is a wish to transmit information for rear channels too, for example, left-hand and a right-hand rear channel for so-called surround sound. Also, in other cases it may be very useful if extra information can be added to existing channels for digital signals having a predetermined format, without the need for extending the number of channels for this purpose. In this context one may think of adding music signals containing music information without vocals, which is commonly referred to as Karaoke, so that the user himself can provide the vocals; or adding music signals in which a specific instrument is omitted, so that the user can play this instrument along with the rest of the recording. One may also think of adding extra information by way of data signals, such as, for example, for Ceefax information.

It will be evident that in all these cases the system is desired to be compatible with existing systems, that is to say, it should be possible to reproduce the original signal information in an undisturbed manner with equipment not comprising a specific decoder for extracting the extra information from the signal. If, for example, there is a television signal containing surround-sound information, in a television set not equipped for producing surround sound, it should be possible to reproduce the information for the left and right-hand channels without this reproduction being disturbed in any audible way by the "masked" information for extracting the signal for the rear channels.

SUMMARY OF THE INVENTION

It is an object of the invention to provide a system having this compatibility feature, and it thereto provides a system of the above type wherein the coder comprises means for analyzing the digital audio signal into frequency sub-bands, means for quantizing the analyzed digital signal in a predetermined manner, and means for determining, on the basis of the acoustic properties of the human auditory system, the amount of extra information that can be added to the quantized digital signal without this extra information being audible with unmodified detection. The extra information and the quantized digital signal are then combined into a compound signal. The coder may further comprise means for reconverting the compound signal into a digital signal having the predetermined format.

According to a preferred embodiment the invention utilizes the psychoacoustic property of the human auditory system such that when the audio frequency band is divided into a number of sub-bands, the bandwidths of which approximately correspond with the bandwidths of critical bands of the human auditory system, the quantizing noise in any sub-band is optimally masked by the signal sample in that sub-band.

In an embodiment in which this principle is implemented the means for analyzing the digital signal comprise analysis filter means for generating a number P of sub-band signals in response to the digital signal by dividing the frequency band thereof into consecutive sub-bands having band numbers p ($123 p \leq P$) according to a filtering method which provides sample frequency reduction. While the bandwidths of the sub-bands preferably approximately correspond to the critical bandwidths of the human auditory system in the respective frequency ranges, it is likewise possible to use a smaller number of sub-bands. If the auxiliary signal is also a digital audio signal, further analysis filter means are preferably also provided for generating a number P of sub-band signals in response to the auxiliary signal by dividing the frequency band of the auxiliary signal into consecutive sub-bands with band numbers p ($1 \leq p \leq P$), according to a filtering method which provides sample frequency reduction, the bandwidths of the sub-bands again preferably approximately corresponding with the critical bandwidths of the human auditory system in the respective frequency ranges. For each of the respective sub-bands means are provided for quantizing the digital signal in a predetermined manner and means for combining the corresponding sub-band samples of the digital and auxiliary signals. Preferably, the coder further derives the P compound sub-band signals, and includes synthesis filter means for constructing a replica of the compound signal in response to the compound sub-band signals, which synthesis filter means combine the sub-bands according to a filtering method which provides sample frequency enhancement corresponding to the frequency sub-division in the analysis filter means.

For extracting the auxiliary signal incorporated in such a compound signal there are provided a decoder, comprising analysis filter means for generating a number of compound sub-band signals in response to the compound signal, these analysis filter means subdividing the frequency band of the compound signal into consecutive sub-bands having band numbers p ($1 \leq p \leq P$) according to a filtering method which provides sample frequency reduction, the bandwidths of the sub-bands corresponding with those of the analysis filter means in the transmitter. The decoder also comprises means for quantizing the compound sub-band signals in a predetermined manner, means for subtracting the respective quantized sub-band signals from the corresponding sub-band signals of the compound signal in order to form sub-band difference signals, and synthesis filter means for constructing a replica of the auxiliary signal from the sub-band difference signals. The synthesis filter means combines the sub-bands according to a filtering method which provides sample frequency enhancement corresponding to the sample frequency reduction in the analysis filter means. The analysis filter means and the synthesis filter means together constitute a perfect reconstruction filter, comprised in the coder and the decoder.

Although the invention can be applied to recording digital information on, for example, a compact disc or video tape, as well as reproducing same, it is also applicable to transmitting and receiving digital information as is done in, for example, television. Transmission and reception will be mentioned hereinafter for brevity, but recording and subsequent reproduction are also implicitly encompassed.

The invention is based on the recognition of the fact that quantizing a digital audio signal in a predetermined manner enables masking of the resultant quantizing noise and of extra information in the form of an auxiliary signal. The auxiliary signal may be in the form of a discrete time signal, generally a digital signal or a data signal, and the re-quantized digital audio signal including the incorporated auxiliary signal can subsequently be reconverted into a compound digital signal again having the predetermined format. When this compound digital signal is received by a receiver that does not comprise a specific decoder, the audio information incorporated in the original digital audio signal can be extracted from such compound signal in the customary fashion, without the auxiliary signal affecting this signal to an audible level, because this auxiliary signal lies below the masking threshold of the audio signal and so remains masked in the quantizing noise. In a receiver that does comprise a decoder, however, the information relating to the auxiliary signal can be derived from the difference between the compound digital signal and the such signal after it has been quantized in the predetermined manner.

The principles on which the invention is based enable in a relatively simple manner to add extra information, in the form of an auxiliary signal, to an existing digital audio signal having a predetermined format, to be called the "main signal" hereinafter, and subsequently to again extract, without affecting it to an audible extent, the original information. The original information can be reproduced even without any modification of the receiving equipment.

The principles underlying this invention can only be applied if a number of requirements are fulfilled, which are the following:

1) The quantization method for the main signal is to be the same both for transmission and reception;

2) The amplitude of the auxiliary signal to be added is to be smaller than a quantization step of the main signal; and 3) The quantization of the main signal is to be performed such that the quantization noise is not audibly enhanced.

Condition (1) can be fulfilled in a simple manner when a choice is made in favour of a fixed quantization step, whose size is thus independent of the amplitude of the main signal. When quantization is effected both at the transmit end and the receive end and the quantization step is fixed, no problems will occur. In practice, however, an adaptive quantization step is preferably used because it will then be possible to achieve a maximum amplitude range for the auxiliary signal. With such adaptive quantization special measures must be taken so as to always unequivocally employ the same quantization step during transmission and reception, both at the transmit end and at the receive end, irrespective of the signal amplitude of the main signal.

According to a preferred embodiment of the invention the magnitude of the quantization step per sub-band depends on the amplitude of the main signal, and there is an exponential relationship with reference to a predetermined basic number between consecutive steps. Thus it is possible to employ adaptive quantization which accommodates itself to the amplitude of the main signal and can be unequivocally determined from the compound signal as received at the receiver, so as to reclaim the main signal. This matter will further explained hereinbelow.

The above condition (2) can be fulfilled by attenuating the auxiliary signal by a specific factor per sub-band at the transmit end, and amplifying this signal again by the same factor at the received end. The magnitude of such factor can be selected in dependence on the magnitude of the quantization step used for quantizing the main signal. If the auxiliary signal is a data signal, no amplitude attenuation is required because in that case it can be determined for each quantized sample of the main signal how many bits form a half quantization step and, consequently, how many data bits of the auxiliary signal can be added to each sample of the main signal.

Condition (3) can basically be fulfilled by choosing the quantization steps small enough so that the audible quantization noise is maintained at a very low level. However, this can lead to a conflict with condition (2). That is, if a small quantization step is used, the amplitude available to the auxiliary signal, which amplitude is to be smaller than this half quantization step, is also very small, which will lead to problems in connection with noise and reproducibility of the auxiliary signal. Therefore, a rather coarse quantization of the main signal is preferably used in combination with measures to make the resultant quantization noise inaudible to the human auditory system. Such measures are already known in the art.

A first such measure is based on the phenomenon that when the audio signal band is divided into a plurality of sub-bands whose bandwidths approximately correspond with the bandwidths of the critical bands of the human auditory system in respective frequency ranges, it may be expected on grounds of psychoacoustic experiments that the quantization noise in such a sub-band will be optimally masked by the signals in this sub-band when the noise masking curve of the human auditory system is taken into account in determining the quantization steps. This curve indicates the threshold value for masking noise produced in a critical band by a single tone in the middle of such band. With a high-quality digital music signal, represented, for example, in accordance with the compact disc standard, by 16 bits per signal sample with a rate of $1/T=44.1$ kHz, it turns out that the use of this prior-art sub-band encoding with a suitably chosen bandwidth and a suitably chosen quantization for the respective sub-bands results in quantized transmitter output signals which can be represented by an average number of approximately 2.5 bits per signal sample, and the quality of the replica of the music signal does not perceptibly differ from that of the original music signal in virtually all passages of virtually all sorts of music signals. For a further explanation of this phenomenon reference is made to the article entitled "THE CRITICAL BAND CODER—DIGITAL ENCODING OF SPEECH SIGNALS BASED ON THE PERCEPTUAL REQUIREMENTS OF THE AUDITORY SYSTEM" by M. E. Krasner in proceedings IEEE ICASSP 80, Vol. 1, pp. 327–331, Apr. 9–11, 1980. By implementing this so-called simultaneous masking in frequency sub-bands the main signal can be quantized with a minimum loss of quality despite a coarse level of quantization. As a result the maximum quantization range for the auxiliary signal, that is to say, the range smaller than a half quantization step, is relatively large, so that this signal too can be reconstructed with a minimum loss of quality.

A further measure known per se for rendering quantization noise inaudible utilizes the psychoacoustic effect of temporal masking, that is to say, the property of the human auditory system that the threshold value for perceiving signals shortly before and shortly after the occurrence of another signal having a relatively high signal energy appears to be temporarily higher than during the absence of the latter signal. In the period of time before and after such a signal having a high signal energy, extra information of the auxiliary signal can now be recorded. It is also possible to combine temporal masking with frequency sub-band masking. A first possibility in this respect, according to the invention, is the implementation of the knowledge about the amplitude of one or more preceding digital signal samples. If there is a decreasing amplitude the quantization step can, in the case of adaptive quantization, be chosen to be larger than would be permissible on the basis of the actual signal amplitude and the selected quantization criterion, because the resultant extra quantization noise at this relatively low amplitude is masked by the preceding larger amplitude(s). Since a coarser quantization can be chosen, more extra information can be masked in the digital signal samples following a large signal amplitude, which favourably affects the signal-to-noise ratio when the auxiliary signal is received. A great advantage of this manner of temporal masking is the fact that no additional delay occurs when the samples are taken in which it is permitted to quantize more coarsely on the basis of temporal masking.

A further possibility is to store the samples of the main signal in blocks and use a single quantization step for all samples in that block on the basis of the maximum signal amplitude in that block, whilst assuming that owing to temporal masking the actually too coarse quantization of the samples having a lower amplitude will be inaudible. However, a block of signal samples must then invariably be stored before a quantization step can be determined.

A special use of the coder is in a device for recording a digital signal on a record carrier, for example a magnetic record carrier. The auxiliary signal which is then also recorded may now serve as a copy inhibit code. Said device can be used by the software industry to generate prerecorded record carriers provided with a copy-inhibit code. When such record carriers are played the analog signal obtained after D/A conversion still contains the auxiliary signal which, however, as stated above, is not audible. Every subsequent recording via said analog path, can now be inhibited if a recording device intended for the consumer market comprises a detection unit which is capable of detecting said auxiliary signal.

Such a device for recording a digital audio signal on a record carrier comprises a coder for sub-band coding of the digital audio signal of given sample frequency 1/T, the coder comprising: analysis filter means responsive to the audio signal to generate a plurality of P sub-band signals, which analysis filter means divide the frequency band of the audio signal in accordance with a filtering method which includes sample frequency reduction into consecutive sub-bands having band numbers $p(1 \leq p \leq P)$, which analysis filter means are further adapted to apply the P sub-band signals to P outputs, which outputs are coupled to P corresponding inputs of a recording unit which is constructed to record the P sub-band signals on the record carrier. The device further comprises a detection unit coupled to the analysis filter means and which is adapted to detect the presence of an auxiliary signal in one or more sub-band signals and to generate a control signal upon detection of the auxiliary signal. The control signal is coupled to a control signal input of the recording unit, and inhibits it from recording the audio signal in the presence of the control signal but permits it to record the audio signal in the absence of the control signal. When the auxiliary signal is detected recording is inhibited, or the signal to be recorded is distorted on purpose before it is recorded. It is obvious that a reproducing device should comprise a decoder which during reproduction reads the digital audio signal together with the auxiliary signal, without the two signals being separated from one another. During a subsequent recording the auxiliary signal in the audio signal can then be detected, if present, so that it is possible to inhibit unauthorized copying of copy-protected audio information.

It is alternatively possible not to inhibit recording of copy-protected information but merely to detect that the audio signal to be copied comprises an auxiliary signal, and to signal that in the relevant case the information is protected and should not be copied.

Such a device, which is also intended for the consumer market for recording a digital audio signal on a record carrier, includes a coder for sub-band coding of a digital audio signal of given sample frequency 1/T, wherein the coder comprises:

analysis filter means responsive to the audio signal to generate a plurality P of sub-band signals by dividing the frequency band of the audio signal into consecutive sub-bands having band numbers $p(1 \leq p \leq P)$ in accordance with a filtering method providing sample frequency reduction, and to apply the P sub-band signals to P outputs, which outputs are coupled to P corresponding inputs of a recording unit for recording the P sub-band signals on the record carrier. The device further comprises a detection unit coupled to the analysis filter means which is adapted to detect the presence of an auxiliary signal in one or more of the sub-band signals and to generate a control signal at an output of the device upon detection of the auxiliary signal. The output is coupled to a signalling unit which, when an audio signal is to be recorded and a control signal is present, signals that such audio signal contain an auxiliary signal.

The above recording device, intended for the consumer market, may be characterized further in that the coder further comprises signal combination means coupled to the analysis filter means and which selectively adds the auxiliary signal, in the absence of a control signal, to one or more of the sub-band signals to form P composite sub-band signals produced at P outputs, which P outputs are coupled to P corresponding inputs of the recording unit. This enables a user of the device to selectively provide his own recordings, if desired, with a copy inhibit code in order to ensure that no copies can be made thereof.

The devices intended for the consumer market may alternatively be characterized in that the coder further comprises signal combination means coupled to the analysis filter means and which always adds the auxiliary signal, in the absence of the control signal, to one or more of the sub-band signals so as to form P composite sub-band signals produced at P outputs which are coupled to P corresponding inputs of the recording unit. In that case there is no longer a selection possibility and in all cases an auxiliary signal will be added to an audio signal to be recorded, if it does not yet contain the auxiliary signal. This enables existing recordings (not provided with the auxiliary signal) or prerecorded tapes (also not provided with the auxiliary signal) to be copied, while it is not possible to make copies of the recordings thus copied.

BRIEF DESCRIPTION OF THE DRAWINGS

Embodiments of the invention will now be described in more detail, by way of example, with reference to the drawings in which.

DESCRIPTION OF THE PREFERRED EMBODIMENTS

Figure 1:
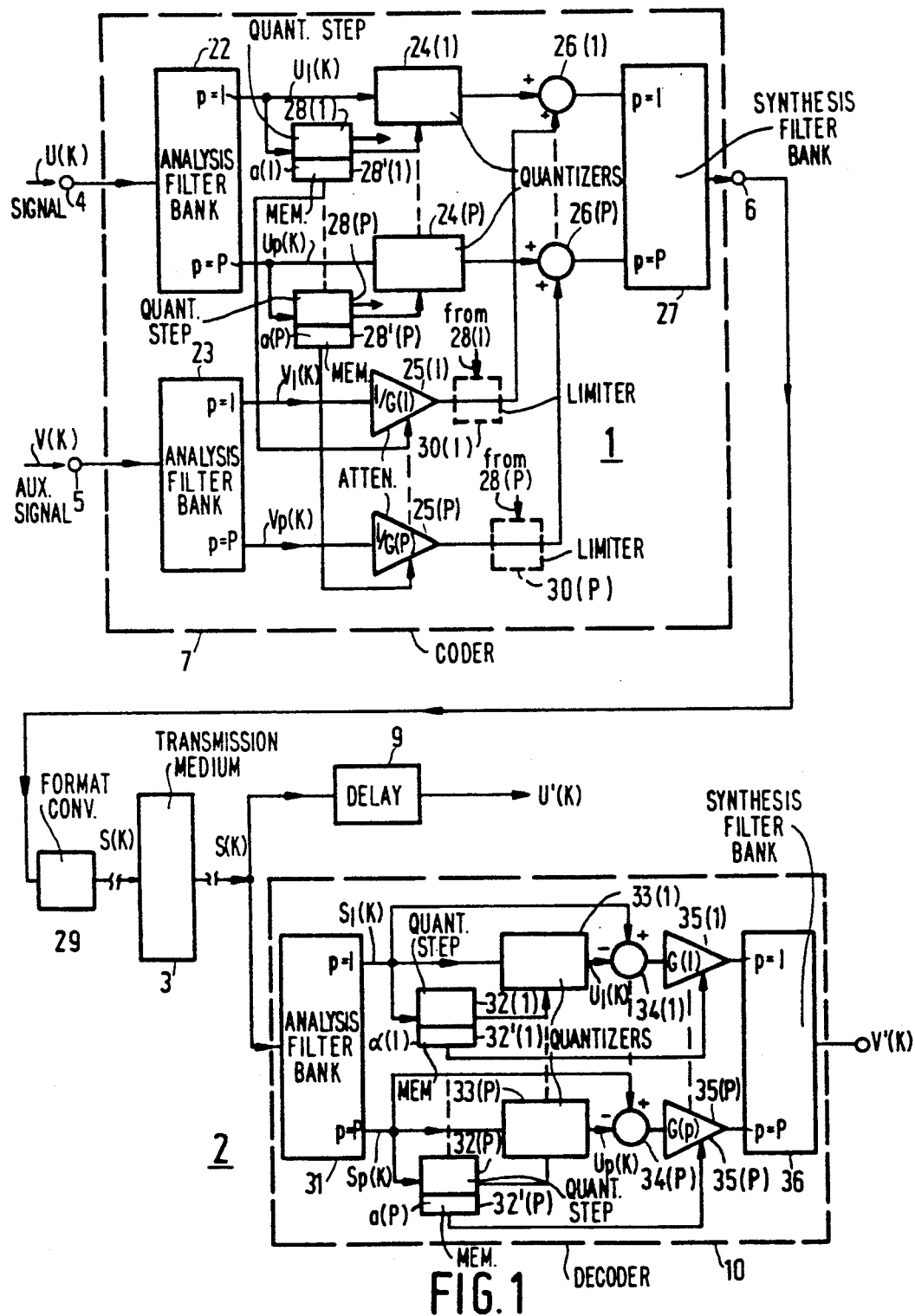
FIG. 1 shows a block diagram of a preferred embodiment of a transmit-receive system comprising a coder and a decoder in accordance with the invention.

FIG. 1 diagrammatically shows a system comprising a transmitter 1 and a receiver 2 for adding and extracting respectively, extra information to and from a digital audio signal having a predetermined format, which information is transferred via or stored in a transmission medium 3. This medium can be a transmission channel or, for example, a record carrier such as a compact disc or a magnetic tape or disc.

The transmitter comprises a coder in the form of a processor 7 having an input terminal 4 for a main digital signal u(k) having the predetermined format and an input terminal 5 for an auxiliary digital signal v(k) and having an output terminal 6. The output terminal 6 of the processor circuit 7 is coupled to the transmission medium 3.

The receiver 2 comprises a delay circuit 9 having a delay τ, as well as a decoder in the form of a processor circuit 10. The input terminals of these two circuits are connected to one another and arranged for receiving the digital compound signal produced by the medium 3. At the output terminal of the delay circuit 9 the main signal is available again, as will be explained hereinafter, in the form of a signal u'(k) and at the output terminal of processor circuit 10 the auxiliary signal is available in the form of a signal v'(k).

The operation of the system according to FIG. 1 is as follows. At the input terminal of the transmitter 1 consecutive samples of the signal u(k) are presented. For example, in the case of an audio signal formed in accordance with the compact disc standard, each signal sample comprises 16 bits and the sampling rate is 44.1 kHz. In the processor circuit 7 it is determined how much information of the auxiliary signal v(k) can be added to each sample of the main signal u(k) on the basis of the chosen method according to which the auxiliary signal v(k) is added, that is, on the basis of temporal masking or simultaneous frequency sub-band masking or a combination of the two. If temporal masking is used, this may be done in the time intervals shortly before and/or shortly after a loud passage in the signal u(k). If simultaneous masking is chosen, it will be possible to add information of the signal v(k) to each signal sample of the signal u(k) by means of sub-division into frequency sub-bands. As stated earlier, a combination of the two types of masking is possible. The combined output signal of the processor circuit 7 is reconverted in a converter 29 into the predetermined format of the digital main signal and applied to the medium 3.

In the receiver 2 the received signal is subjected to a decoding operation in the processor circuit 10 in order to separate the signals u(k) and v(k), so that at the output of circuit 10 the received main signal v'(k) is available, whereas through delay circuit 9, whose delay is equal to that which is produced by the processor circuit 10, the received auxiliary signal u'(k) is available in synchronism with the signal v'(k).

In the sequel the structure of the processor circuits 7 and 10 will be explained.

The processor circuit 7 comprises filter banks 22 and 23 for splitting up through sample frequency reduction the respective signals u(k) and v(k) into P consecutive sub-bands, whose bandwidths approximately correspond with the critical bandwidths of the human hearing in the respective frequency bands. The use and structure of such filter banks is known from, for example, the above article by Krasner and the chapter of "Sub-band coding" in the book entitled "Digital coding of waveforms" by N. S. Jayant and P. Noll, Prentice Hall Inc., Englewood Cliffs, N.J., 1984, pp. 486-509. Each of the P sub-band signals of filter bank 22 is applied to a respective adaptive quantizer 24(p), with $1 \leq p \leq P$, whereas each sub-band output signal of filter bank 23 is applied to a respective attenuator 25(p), with $1 \leq p \leq P$. The output signals of respective summing circuits 26(p) are applied to a synthesis filter bank 27 in which the P sub-bands are combined to into a composite signal having the same bandwidth as the original signals u(k) and v(k). The output signal of the synthesis filter bank 27 is encoded in a converter 29 into a digital signal having a predetermined format, for example, 16 bits, and applied to the medium 3 as a compound signal s(k).

If the number of quantization levels per frequency sub band in the transmitter 2 is chosen in the right way, nothing will be perceived in the digital signal applied to medium 3 of the added auxiliary signal v(k), provided that the condition is fulfilled that the amplitude of each auxiliary signal sample to be added is smaller than q/2 in each frequency sub-band of each sample of $u_p(k)$, where q is the quantization step of the sample of $u_p(k)$.

At the receive end the original signal u(k) can now be reproduced directly without any adaptation by means of a non-adaptive receiver, because in the compound digital signal s(k) the extra information in the signal v(k) is not audible, because it is masked by the signal u(k).

A receiver which is indeed suitable for receiving both the signal u(k) and the signal v(k), for example, a D2MAC television receiver with surround-sound reproduction features comprises, however, a filter bank 31 which is arranged in the same way as the filter bank 22. This filter bank 31 splits up again the received compound signal s(k) into P sub-bands having the same bandwidths and central frequencies as the sub-bands of the filter bank 22. Each of these sub-band signals is applied to an adaptive quantizer 33(p), with $1 \leq p \leq P$. A proper dimensioning of this quantizer provides that for each sub-band the signal $u_p(k)$ is again obtained from each of the P sub-bands after quantization. By subtracting each of these quantized sub-band signals $u_p(k)$ from the compound sub-band signal $s_p(k)$ in a subtracting circuit 34(p), the signal $v_p(k)$ is obtained for each sub-band p. Each of these signals $v_p(k)$ is amplified in an amplifier 35(p), with $1 \leq p \leq P$, by a factor G which is the same as that which is used in the coder for attenuating the relevant sub-band signals $v_p(k)$ and, subsequently, these scaled signals $v_p(k)$ are applied to a synthesis filter bank 36 which reconstructs the signal v'(k) from the individual sub-bands $v_p(k)$ The signal u'(k) can be extracted directly, as observed hereinbefore, from the compound signal s(k) and needs only to be delayed in a delay circuit 9 over a time which is equal to the delay time introduced by the processor 10, if the main signal and the auxiliary signal are desired to be synchronous.

In the case of a television transmit-receive system with surround-sound reproduction facilities, in the left channel the signals u(k) and v(k) may be the digital reproduction of, for example, the signal LV+LA and the signal LA respectively. An unmodified receiver will receive the complete sound signal LV+LA and can reproduce this without complications, whereas in a modified receiver, the signals LA and LV can be applied separately to the relevant reproduction channels after u(k) and v(k) have been split up by mans of a subtracting circuit.

In the sequel it will be discussed in what way the adaptive quantizers 24(p) and 33(p) can be arranged in the transmitter and receiver of the system according to FIG. 1 so as to obtain in an unequivocal manner an adaptive quantization for each of the sub-band signals. For this purpose the number of quantization steps desired for each of the sub-bands is determined beforehand, and this number i(p) is constant for each of the sub-bands.

In order that quantization be adaptive, the quantization steps are to be chosen approximately in proportion to the signal size. For this purpose the amplitude axis is subdivided into sections T, and if the maximum amplitude of a sub-band sample of the signal u(k) is situated in a specific section $T_n$, where n is an integer, the quantization steps for that sample have a specific magnitude which is equal to the magnitude of the section $T_n$. The quantization level is positioned in the centre of said section, so as to allow the auxiliary signal v(k) to have equal amplitude ranges on either one of the two sides of this section relative to the quantization level, without the compound signal $s_p(k)$ being situated in another quantization section.

Since one wishes to choose the quantization steps in proportion to the maximum signal amplitude, and the number of quantization steps is fixed, the magnitudes of the sections T which determine the magnitude of the quantization step must increase in proportion to the maximum signal amplitude. Therefore, the variation of the section magnitudes is u preferably exponential, each section varying from $a^{(n-\frac{1}{2})}$ to $a^{(n+\frac{1}{2})}$ where a is a constant and n an integer. The quantization level belonging to a specific section $T_n$ is then $\frac{1}{2}(a^{n+\frac{1}{2}}+a^{n-\frac{1}{2}})$.

Figure 2:
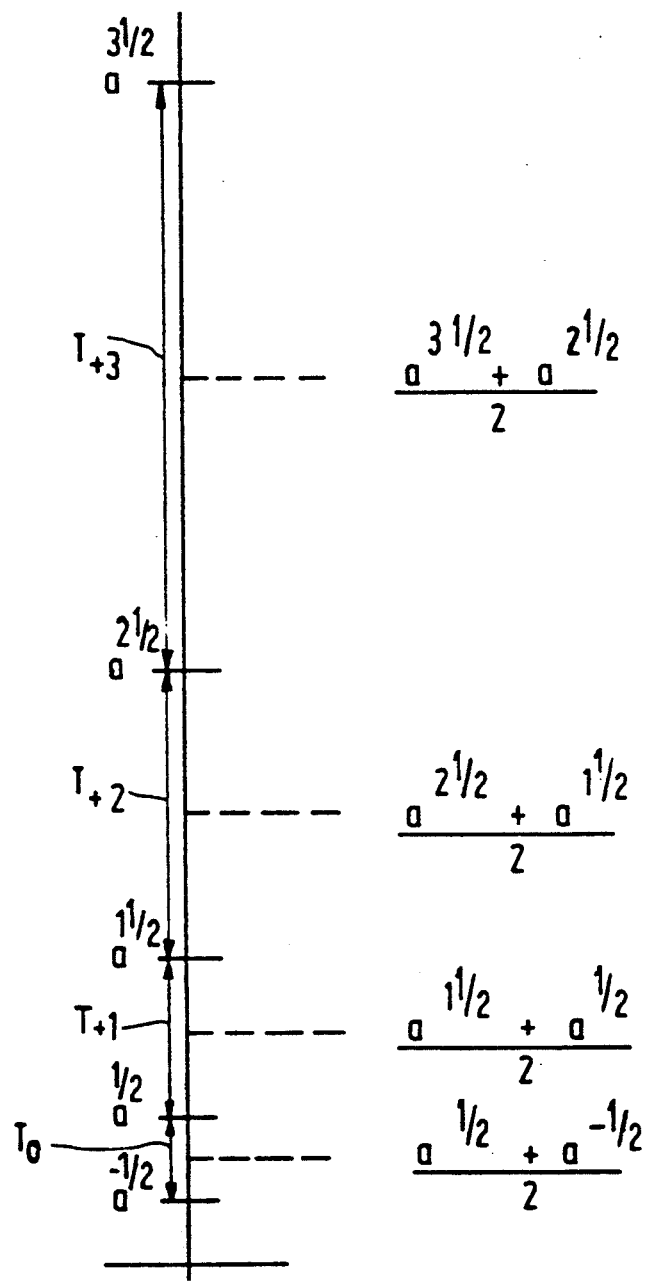
FIG. 2 illustrates diagrammatically the quantization method in the coder.

FIG. 2 shows an amplitude axis on which the division of the quantization levels according to the embodiment is shown. Depending on the absolute value of the maximum amplitude û(k) of the main signal u(k), the quantization step is equal to the size of the section in which û(k) is located and thus equal to $a^{(n+\frac{1}{2})}-a^{(n-\frac{1}{2})}$. In this case the choice of the value of the factor a is free. However, it is often desired that also the value 0 be a quantization level, because then it will not matter whether the maximum signal level of u(k) is positive or negative, whereas relatively small signal amplitudes are also avoided to be quantized at a considerably higher quantization level. This provides the additional requirement that the chosen quantization level be an integer number of times the quantization step. This requirement limits the choice of the constant a to $a=(2k+1)/(2k-1)$ with $k=1,2\ldots$; that is to say, $a=3$; $a=5/3$; $a=7/5\ldots$ and so on.

The consequence of the choice of the quantization steps according to this preferred embodiment is the fact that in the decoding arrangement the signal $v_p(k)$ can always be extracted from the compound signal s(k) in an unequivocal manner, because for a specific signal amplitude the same quantization level will always be employed. Once this quantization level and thus $u_p(k)$ is determined, $u_p(k)$ can be subtracted from the compound signal to obtain the signal $v_p(k)$.

For controlling the respective quantizers 24(p) and 32(p), the processor circuit 7 comprises quantization step determining circuits 28(p) and processor circuit 10 the quantization step determining circuits 32 (p) respectively, the structure of these circuits being basically identical. The circuits 28(p) and 32(p) comprise memory sections 28'(p) and 32'(p) respectively, in which for each sub-band the predetermined value for the basic number a is stored, which may be different for each sub-band. The circuits 28(p) and 32(p) compute for each sample of $u_p(k)$ and $s_p(k)$ respectively, the size of the quantization step on the basis of the above-described quantization procedure and apply through outputs the values of these steps to the respective quantizers 24(p) and 33(p). A value derived from the value a in the respective memory sections 28'(p) and 32'(p) is also applied to a control input of the respective attenuators 25(p) and the respective amplifiers 35(p) so as to attenuate and amplify respectively, the signals $v_p(k)$ by a factor G. The attenuation factor or gain factor G respectively, derived from the value a is $2a/(a-1)$. It is known that û (k), the maximum amplitude of the signal u(k), is equal to $a^{(n+\frac{1}{2})}$ whereas the maximum permissible amplitude v̂(k) of the auxiliary signal v(k) is then equal to $\frac{1}{2}[a^{(n+\frac{1}{2})}-a^{(n-\frac{1}{2})}]$. Now $û(k)/v̂(k)=2a/(a-1)$. If it is provided beforehand that always v̂(k)<û(k), which in practice can be realised without any problems, it is always certain that v̂(k)<q/2 if for the factor G is chosen $G=2a/(a-1)$. In practical cases the condition v̂(k)<û(k) has often been fulfilled automatically because of the relationship which exists between these two signals.

In order to assure that v̂(k) will never exceed the value q/2 under any circumstances, the output line of each attenuator 25(p) can comprise a limiter 30(p), two of which limiters 30(1) and 30(p) are shown in dashed form in FIG. 1. Each limiter receives information about the limitation value to be set from the corresponding quantizing step selection circuits 28(p) and limits the output signal of the attenuator 25(p) to a maximum of q/2.

If a choice is made in favour of simultaneous masking combined with temporal masking, the circuits 28(p) and 32(p) comprise the circuits necessary for comparing the current sample of $u_p(k)$ to one or more previous samples so as to determine a larger quantization step on the basis of pre-stored information about the variation of the temporal masking curve belonging to a specific maximum amplitude of $u_p(k)$, if the current sample has a lower amplitude than the amplitude of one or more of the previous samples.

In the case of block quantization, a buffer circuit will be provided between each of the P outputs of the filter bank 22 and the input of the relevant quantizer 24(p), which circuit constantly stores a block of M signal samples, determines the maximum block amplitude and uses this value for determining the quantization step for the entire block.

Finally, it is observed that additional room can be found for adding v(k) in a sub-band p by also considering the amplitude variations in adjacent sub-bands. If, in an adjacent sub-band, a large amplitude of u(k) occurs, whereas in the p sub-band the amplitude of u(k) is very small or even zero, one may decide, on the basis of the masking properties of the signal in this adjacent sub-band, to allow a specific amount of the signal v(k) to enter the sub-band p.

It is further pointed out that at the output of the quantizers 33(p) a signal $u_p(k)$ is available which basically has less quantization noise than the signal s(k), so that in a receiver comprising a decoder a better replica of the signal u(k) can be derived from these output signals by means of an additional synthesis filter.

Figure 3:
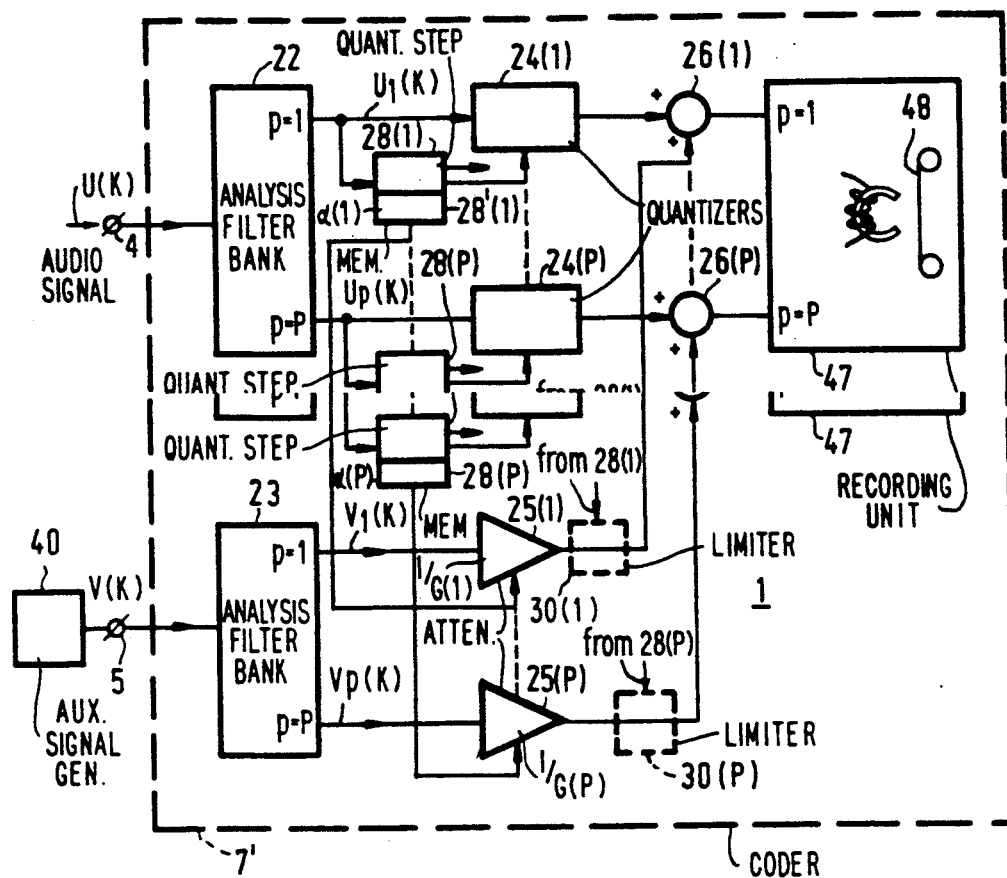
FIG. 3 shows a device for recording a digital audio signal on a record carrier.

FIG. 3 shows a device for recording a digital audio signal, such as the digital audio signal u(k) in FIG. 1, on a record carrier. The device comprises a coder 7' which bears much resemblance to the coder shown in FIG. 1. The only difference is that the synthesis filter bank 27 has been dispensed with. Instead, the outputs of the summing circuit 26(p) are coupled to a recording unit 47. This recording unit is constructed to record the P sub-band signals applied to its inputs on a record carrier 48. Averaged over all sub-bands this enables such a data reduction to be achieved that the information to be recorded on the record carrier is recorded with, for example, 4 bits per sample, while the information applied to the input 4 comprises, for example, 16 bits per sample.

The auxiliary signal V(k) is generated in an auxiliary signal generator 40 which has an output coupled to the input 5, to apply the auxiliary signal to the coder 7'. By means of the coder 7' the auxiliary signal is inserted in the audio signal in the manner described hereinbefore. The auxiliary signal can thus be inserted into one or more of the sub-band signals into which the audio signal (k) has been divided.

Preferably, the auxiliary signal is accommodated in one or more of the lower sub-bands (of low frequency). In the sub-bands which are situated in the low-frequency range the signal content of the audio signal is generally maximal. This means that the masking threshold in said sub-band(s) is also high. This enables an auxiliary signal of large amplitude to be inserted in the audio signal. This simplifies detection of the auxiliary signal.

Thus, by means of the device shown in FIG. 3 record carriers 48 are obtained on which the audio signal including the auxiliary signal is recorded. The method of recording on the record carrier 48, as is effected in the recording unit 47, is not relevant to the present invention. It is possible, for example, to employ a recording method as known in RDAT or SDAT recorders. The operation of RDAT and SDAT recorders is known per se and is described comprehensively inter alia in the book "The art of digital audio" by J. Watkinson, Focal Press (London) 1988. Obviously, the recording unit 47 should be capable of converting the parallel data stream of the P sub-band signals into a signal stream which can be recorded by means of an RDAT or SDAT recorder.

Figure 4:
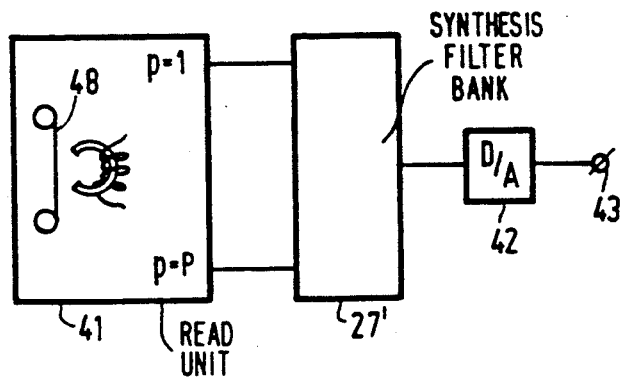
FIG. 4 shows a device for reproducing the signal recorded on the record carrier by means of the device shown in FIG. 3.

FIG. 4 shows diagrammatically a device for reproducing the audio signal as recorded on the record carrier 48 by means of the device shown in FIG. 3. For this purpose the device comprises a read unit 41 which is constructed to read the data stream from the record carrier 48 and to supply the P sub-band signals via P outputs. These P sub-band signals are then applied to P inputs of a synthesis filter bank 27', having the same function as the filter bank 27 in FIG. 1. This means that the P sub-band signals are recombined to form a digital signal of a predetermined format of, for example, 16 bits. After D/A conversion in the D/A converter 42 the audio signal is then available again on the output terminal 43.

The audio signal then still contains the auxiliary signal. However, this auxiliary signal is not audible because it is masked by the audio signal.

Figure 5:
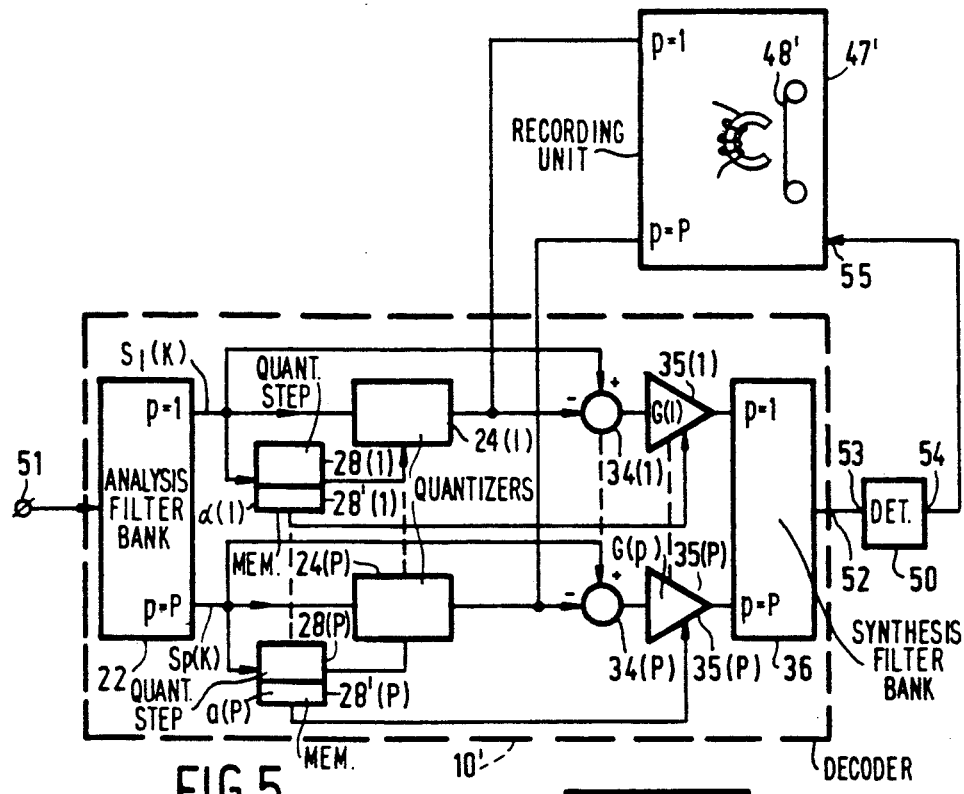
FIG. 5 shows another embodiment.

FIG. 5 shows a device for recording an audio signal, for example the audio signal reproduced by the device shown in FIG. 4. Such a device is intended for example for the consumer market. The device is capable of normally recording audio information not containing a copy inhibit code on a record carrier. However, the device comprises a detector unit to detect a copy inhibit code inserted in the audio signal to inhibit recording of this audio signal.

The recorder shown in FIG. 5 bears much resemblance to the recorder shown in FIG. 3, the difference being that the recorder in FIG. 5 is not capable of inserting a copy inhibit code into an audio signal. This means that the elements bearing the reference numerals 23, 25(1) to 25(P), 28(1) to 28(P) and 26(1) to 26(P) are dispensed with. The device shown in FIG. 5 further comprises subtractor circuits 34(1) to 34(P), amplifiers 35(1) to 35(P), a synthesis filter bank 36, and a detector unit 50. The section 10' of the device shown in FIG. 5, indicated by means of a broken line, is in fact identical to the decoder 10 in FIG. 1. This means that the section 10' is adapted to filter out the auxiliary signal which, if present in the digital audio signal applied to the input 51, then becomes available on the output 52. The detector unit 50, which has an input 53 coupled to the output 52, is constructed to detect said auxiliary signal and to generate the control signal which is then applied to the control signal input 55 of the recording unit 47' via the output 54.

The recording unit 47' is constructed in such a way that if a control signal appears on the control signal input 55 the recording unit 47' does not record the sub-band signals applied to its inputs or seriously distorts these sub-band signals before they are recorded. In the absence of a control signal on the control signal input 55 the recording unit 47' will record the sub-band signals applied to its inputs.

In this way an audio signal containing a copy-inhibit code in the form of the auxiliary signal inserted in the audio signal is prevented from being recorded on the record carrier 48' by the device.

In the device shown in FIG. 5 it is assumed that the auxiliary signal is accommodated in a number of sub-band signals. However, as already stated, the auxiliary signal may also be inserted in only one sub-band signal. In that case only one subtractor circuit 34 and one amplifier 35 would be required and the synthesis filter bank 36 will have only one input. In the filter bank 36 the auxiliary signal is converted into a digital signal of, for example, 16 bits.

The detector unit 50 may be a digital detector unit which can directly detect the presence or absence of a digital signal. Another possibility is the use of an analog detector. In that case the output signal of the filter bank must first be converted into an analog signal and the detector unit 50 will comprise a narrow band band-pass filter, a rectifier and a threshold detector. If the input signal of the device is an analog signal an A/D converter is arranged between the terminal 51 and the input of the filter bank 22.

If the auxiliary signal is inserted in only one sub-band, for example the lowest sub-band, it will be adequate to use a simpler detection circuit in the form of a digital filter coupled to the output P=1 of the analysis filter 22. This filter may be for example a recursive filter having a sharp filter characteristic, the maximum in the filter characteristic coinciding with the frequency of the auxiliary signal. The output of the digital filter may then be coupled to the input 53 of the detector unit 50. In that case the elements 34(1) to 34(P), 35(1) to 35(P) and 36 may be dispensed with.

Figure 6:
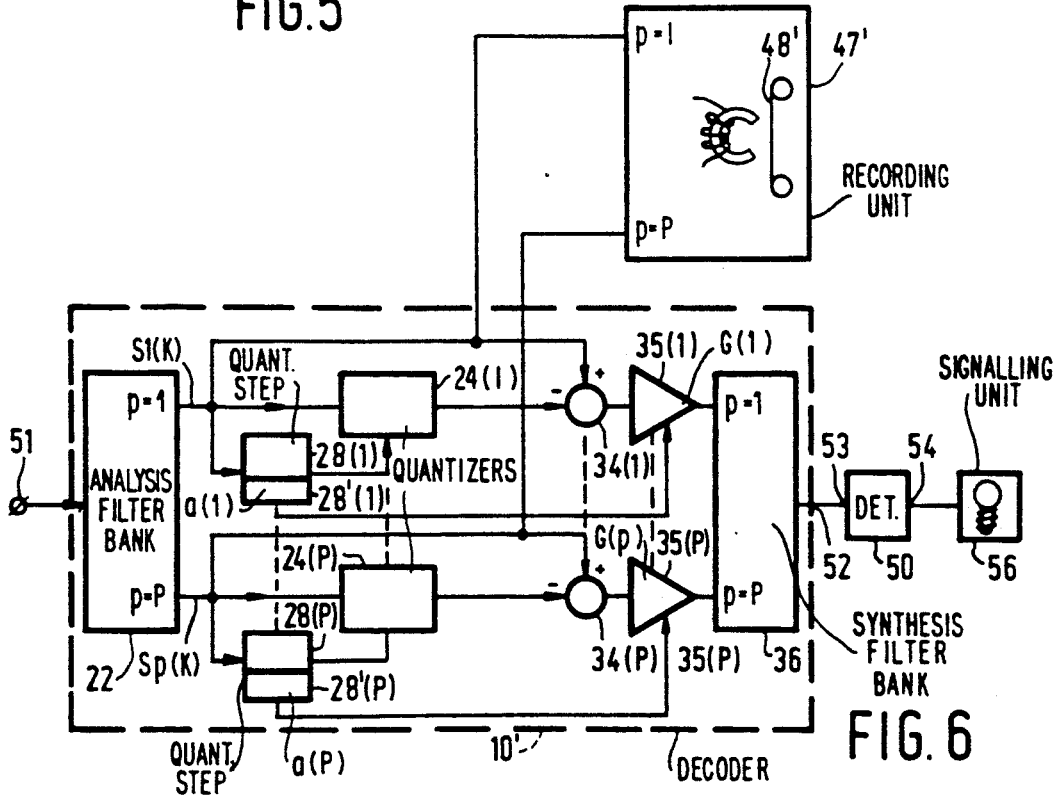
FIG. 6 shows a further embodiment.

The embodiment shown in FIG. 6 bears much resemblance to that shown in FIG. 5. The output of the detector unit 50 is now coupled to an input of a signalling unit 56, for example in the form of a light-emitting diode. The auxiliary signal in the audio signal then does not function as a copy inhibit code but merely as a signalling code to signal that it is, in fact, not allowed to copy the relevant audio signal. In this case the decision whether the audio signal is subsequently copied depends on the user himself.

If the presence of the auxiliary signal in the audio signal to be recorded is detected the detector unit 50 generates a control signal, upon which the signalling unit 56 (the diode) lights up. The user may now decide to discontinue recording.

From FIG. 6 it is evident that the inputs of the recording unit 47' are coupled to the outputs of the analysis filter means 22, so that if the user should decide to continue recording, the audio signal, including the auxiliary signal, will be recorded.

Figure 7:
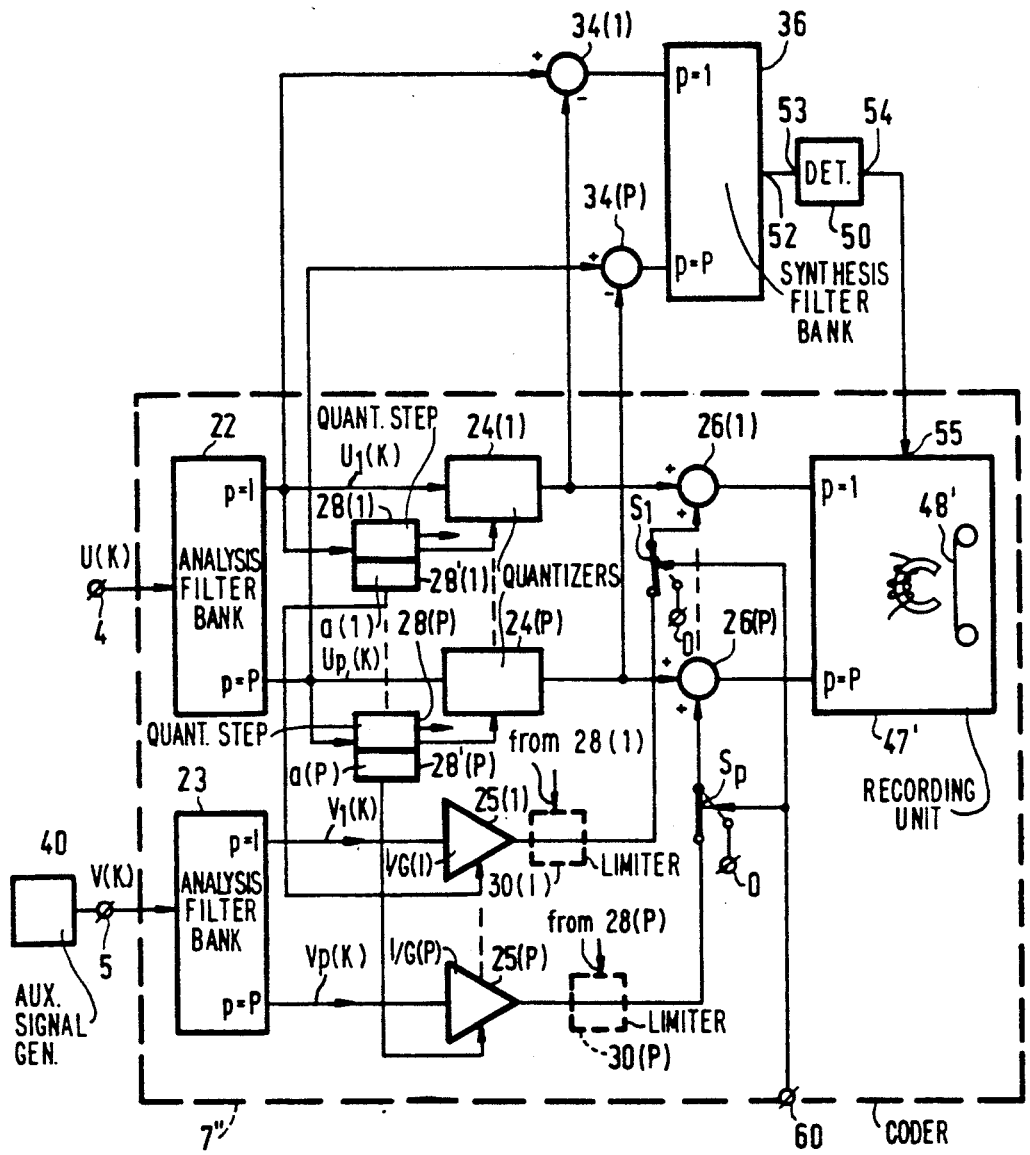
FIG. 7 shows still another embodiment.

FIG. 7 shows another embodiment of the recording device. The device shown in FIG. 7 is an extension of the recorder shown in FIG. 3. The controllable amplifiers 35(1) to 35(P) are not shown for simplicity. The device shown in FIG. 7 is in addition adapted to selectively insert a copy inhibit code to the signal to be recorded, assuming that the signal applied to the input 4 does not yet contain a copy inhibit code. In that case recording will be inhibited by means of the control signal applied to the control signal input 55 of the recording unit 47'.

The circuit bearing the reference numeral 7'' substantially identical to the circuit 7' in FIG. 3, the difference being that it comprises an additional control signal input 60 via which a control signal can be applied to switches $S_1$ to $S_p$ arranged in the lines to the summing circuit 26(1) to 26(P).

If the signal u(k) applied to the input 4 does not contain a copy inhibit code the signal can be recorded on the record carrier 48'. If a control signal is applied to the switches $S_1$ to $S_p$ via the input 60 the switches will be in the position shown. This means that the auxiliary signal V(k) is added to the signal to be recorded via the summing circuits 26(1) to 26(P), to inhibit further copying. If another control signal is applied to the input 60, the switches $S_1$ to $S_p$ will be in the position not shown. This means that the value "0" is applied to all the summing circuits 26, so that merely the signal u(k), without auxiliary signal, is recorded on the record carrier 48'.

Again it is obvious that if the auxiliary signal is recorded in only one sub-band only one summing circuit 26(P) will be provided and the control signal would be applied to only one switch $S_p$ via the terminal 60.

Figure 8:
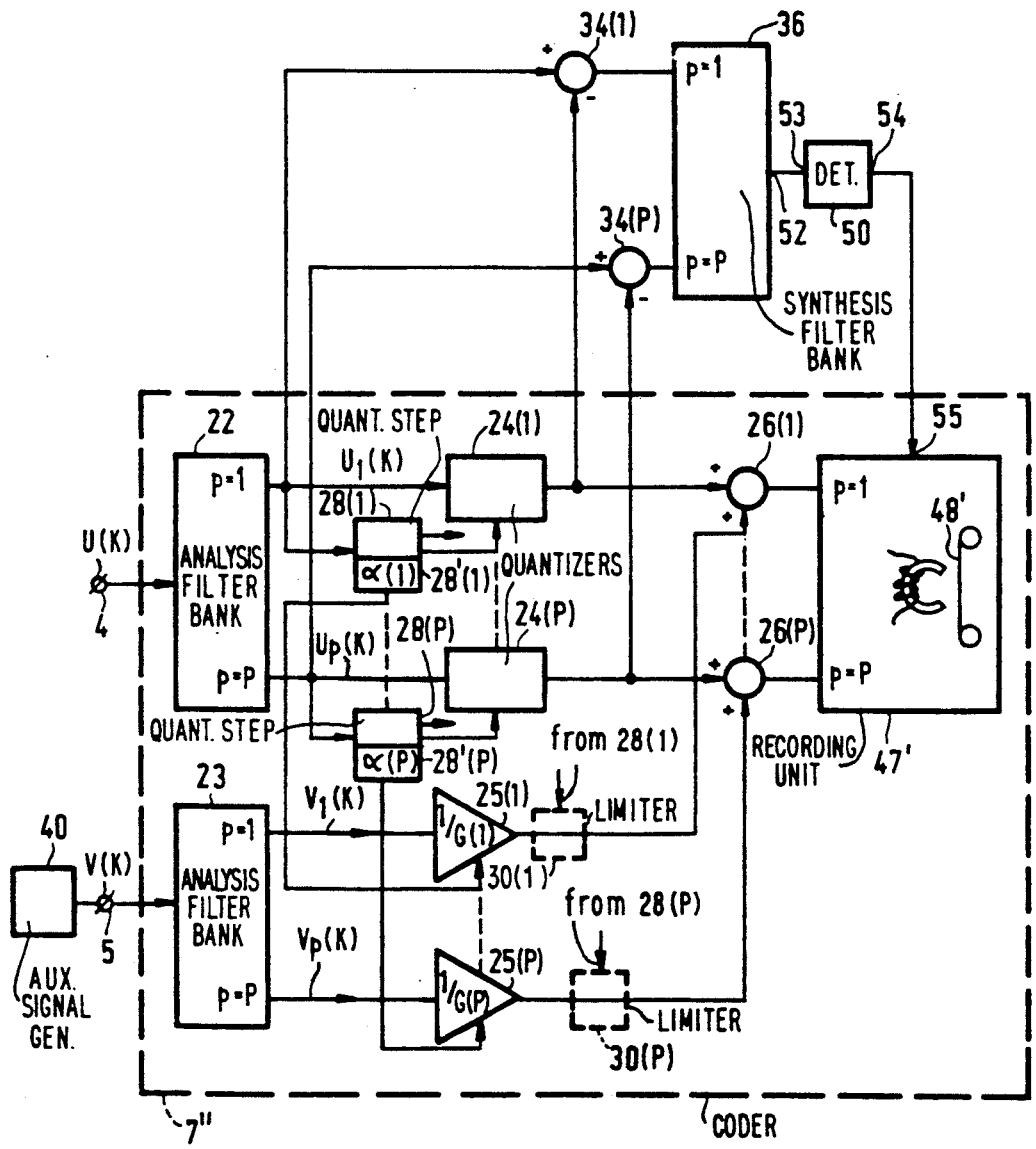
FIG. 8 shows yet another embodiment of a device for recording a digital audio signal.

FIG. 8 shows a recorder embodiment which bears much resemblance to that shown in FIG. 7. The embodiment shown in FIG. 8 excludes the possibility of making a choice whether the audio signal which does not contain a copy inhibit code will be provided with such an inhibit code. This means that if the detector unit 50 detects that the signal to be recorded does not contain an auxiliary signal, this auxiliary signal will be inserted automatically. FIG. 8 shows that interconnections are now provided between the outputs of the amplifiers 25(1) to 25(P) and the (second) inputs of the signal combination units 26(1) to 26(P). The switches $S_1$ to $S_p$ and the control signal input 60 in FIG. 7 are consequently dispensed with.

Such a recorder is very useful if it has been decided to allow copies to be made only of prerecorded record carriers (which are not provided with said auxiliary signal) and original recordings (which also do not contain said auxiliary signal), copying of these copies, however, being inhibited. A prerecorded record carrier can now be copied normally. However, the resulting copy is provided with an auxiliary signal and cannot be copied again.

It is to be noted that all the embodiments have been described with reference to devices for recording a digital audio signal on a magnetic record carrier. However, the invention should not be regarded as limited to magnetic record carriers only. The invention likewise relates to devices which record the audio signal on an optical record carrier. In the future this possibility will become available to the consumer, with the advent of CD erasable and CD write-once and magnetooptical recording technologies.

We claim:

1. A coder for incorporating an auxiliary signal into a digital audio signal having a predetermined data format, comprising:

first analysis filter means for analyzing the frequency band of the audio signal into a plurality P of successive sub-bands so as to derive P audio signal sub-band samples;

means for quantizing the respective audio signal sub-band samples in accordance with quantizing steps based on a predetermined quantization criterion so as to derive P quantized audio signal sub-band samples, the quantizing step for each sub-band being adapted in accordance with the maximum amplitude of the signal sample in sub-band;

second analysis filter means for analyzing the auxiliary signal into said frequency sub-bands so as to derive samples thereof in one or more of such sub-bands;

means for attenuating the auxiliary sample in each sub-band to a level below that of the quantizing step employed for the audio signal in said sub-band; and means for combining the quantized audio signal sample and attenuated auxiliary signal sample in each sub-band so as to derive a combined signal sample in each sub-band;

whereby the auxiliary signal sample included in the combined signal sample in any sub-band will be inaudible upon audio reproduction of such combined signal sample, such audio reproduction only audibly reproducing the audio signal sample included in such combined signal sample.

2. A coder as claimed in claim 1, further comprising synthesis filter means for assembling the combined sub-band signals of all sub-bands into a compound digital audio signal having the said predetermined data format.

3. A coder as claimed in claim 1, wherein the auxiliary signal is a further digital audio signal.

4. A coder as claimed in claim 1, wherein said sub-bands correspond to critical frequency bands of the human auditory system for masking of noise in the presence of sound in such frequency bands.

5. A coder as claimed in claim 4, wherein said quantizing means adaptively quantizes the audio signal sample in any sub-band using a quantizing step adapted in accordance with the maximum amplitude of said audio signal sample relative to an exponential scale based on a predetermined numerical constant (a).

6. A coder as claimed in claim 5, wherein the quantizing step for any sub-band is further adapted in accordance with the maximum amplitudes of audio signal samples in one or more preceding sub-bands.

7. A coder as claimed in claim 5, wherein said attenuating means attenuates the auxiliary signal sample in each sub-band by a factor G given by $G = 2a/(a-1)$.

8. A decoder for a received digital audio signal which is an encoded form of an original digital audio signal, the received signal having a plurality (P) of successive frequency sub-bands which respectively include quantized samples of the original digital audio signal, one or more of said sub-bands also including samples of an auxiliary signal, each auxiliary signal sample being below the level of the quantizing step applicable to the quantized audio signal sample in the corresponding sub-band; said decoder comprising:

analysis filter means for analyzing the received signal into said P sub-bands so as to derive P sub-band samples thereof;

means for quantizing the respectively sub-band samples using a quantizing step in each sub-band the same as that applicable to the quantized sample of the original audio signal in such sub-band;

means for subtracting the quantized signal sample in each sub-band from the received signal sample in such sub-band so as to thereby derive a difference signal sample for each sub-band, such sub-band difference signal samples being samples of said auxiliary signal in such sub-bands;

means for amplifying the respective sub-band samples of the auxiliary signal by amounts corresponding to the quantizing steps applicable to the respective sub-bands; and synthesis filter means for combining the amplified sub-band samples of the auxiliary signal so as to thereby reconstruct said auxiliary signal.

9. A decoder as claimed in claim 8, wherein said quantizing means quantizes the received signal sample in any sub-band using a quantizing step corresponding to the maximum amplitude of said signal sample in said sub-band relative to an exponential scale based on a predetermined numerical constant (a).

10. A decoder as claimed in claim 9, wherein said amplifying means amplifies each sub-band sample of said auxiliary signal by a factor G given by $G = 2a/(a-1)$.

11. Apparatus for recording a digital audio signal having a predetermined data format on a record carrier, comprising:

coding means including
analysis filter means for analyzing the frequency band of the audio signal into a plurality P of successive sub-bands so as to derive P audio signal samples in such sub-bands, the sub-bands corresponding to critical frequency bands of the human auditory system for masking of noise in the presence of sounds in such frequency bands;

means for quantizing the respective sub-band samples in accordance with quantizing steps based on a predetermined quantization criterion so as to derive P quantized sub-band samples, the quantizing step for each sub-band being adapted in accordance with the maximum amplitude of the signal sample in such sub-band; and signal combining means including synthesis filter means coupled to said analysis filter means and to said quantizing means, said signal combining means being adapted to derive sub-band difference signals corresponding to the difference between each sub-band signal sample and the quantized signal sample in such sub-band and to combine such difference signals into an auxiliary signal;

a recording unit for receiving the P quantized sub-band signal samples and recording them on said record carrier; and detecting means coupled to said signal combining means and responsive to the auxiliary signal produced thereby to supply a control signal to said recording unit, said control signal signifying that the received audio signal is protected against recording thereof.

12. Recording apparatus as claimed in claim 11, wherein said control signal inhibits said recording unit from recording the P quantized sub-band signal samples.

13. Recording apparatus as claimed in claim 11, further comprising means for generating an additional auxiliary signal and means for selectively including samples of the additional auxiliary signal in one or more of the sub-bands of the quantized signal samples, so that the auxiliary signal samples will be recorded on said record carrier by said recording unit together with the quantized signal samples.

14. A record carrier having recorded thereon a compound signal comprising:

a digital audio signal in the form of a plurality P of sub-band samples thereof in P successive frequency sub-bands, such sub-band samples having been quantized in accordance with quantizing steps applicable to the respective sub-bands; and an auxiliary signal in the form of sub-band samples thereof in one or more of said sub-bands, the amplitude of the auxiliary signal sample in any sub-band being below the level of the quantizing step applicable to the audio signal sample in such sub-band;

whereby upon audible reproduction of sound corresponding to the recorded compound signal the auxiliary signal sub-band samples thereof will be substantially inaudible, only the audio signal sub-band samples thereof audibly contributing to the resulting sound.

* * * * *